(12) United States Patent
Lloyd et al.

(10) Patent No.: US 6,552,336 B1
(45) Date of Patent: Apr. 22, 2003

(54) NON-INVASIVE, OPTO-ACOUSTIC WATER CURRENT MEASUREMENT SYSTEM AND METHOD

(75) Inventors: Jack Lloyd, Panama City, FL (US); Jeff Rish, Lynn Haven, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 105 days.

(21) Appl. No.: 09/685,144

(22) Filed: Oct. 11, 2000

(51) Int. Cl.⁷ ................................................ G01S 18/88
(52) U.S. Cl. ...................... 250/306; 344/22; 367/100; 73/861.18; 73/861.23; 73/861.19; 73/861.25; 73/861.26; 73/861.27-861.31
(58) Field of Search .................... 250/306; 342/22; 367/100; 73/861.18, 861.19, 861.25, 861.26–861.31

(56) References Cited

U.S. PATENT DOCUMENTS 5,745,437 A * 4/1998 Wachter et al. ............. 367/100
6,232,913 B1 * 5/2001 Lehtinen ..................... 342/137
6,255,980 B1 * 7/2001 Mathews ...................... 342/22

* cited by examiner

Primary Examiner—Bruce Anderson
Assistant Examiner—Zia R. Hashmi
(74) Attorney, Agent, or Firm—Harvey A. Gilbert; Donald G. Peck

(57) ABSTRACT

A method and system are provided for measuring water current. An acoustically-modulated beam of radiation is transmitted to a target location on the surface of a body of water. As the beam transits the water, acoustic radiation propagates away from the beam towards the surface and experiences a Doppler shift in frequency relative to the acoustic frequency used for modulation. The Doppler shift is caused by current in the water through which the acoustic radiation transits. The Doppler-shifted frequency is measured as an indication of water current.

19 Claims, 2 Drawing Sheets

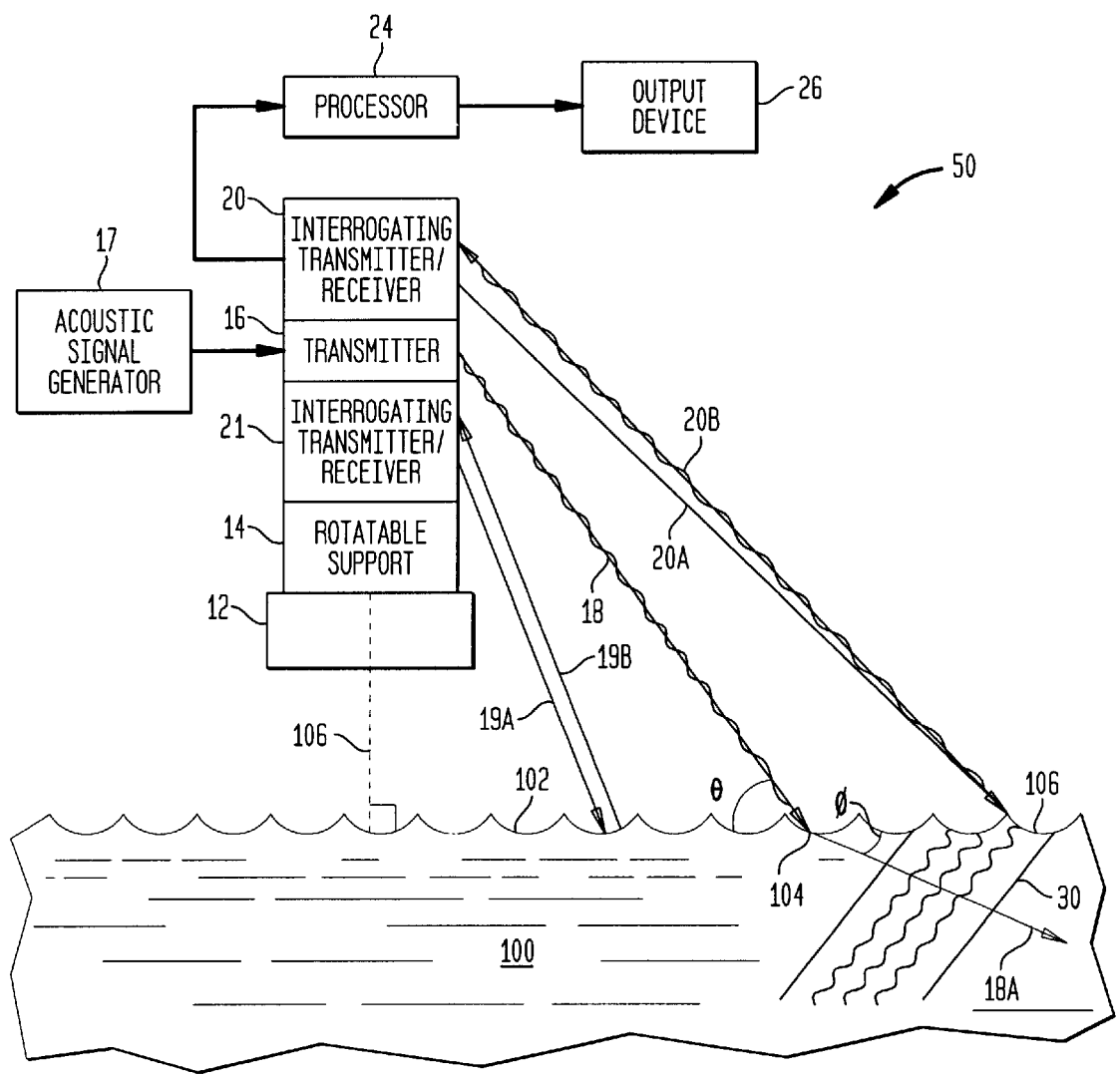

NON-INVASIVE, OPTO-ACOUSTIC WATER CURRENT MEASUREMENT SYSTEM AND METHOD

CROSS-REFERENCE TO RELATED PATENT APPLICATIONS

This patent application is co-pending with one related patent application entitled "NON-INVASIVE WATER CURRENT MEASUREMENT SYSTEM AND METHOD", Ser. No. 09/588,641, filed Jun. 6, 2000, and owned by the same assignee as this patent application.

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to the measurement of water current, and more particularly to a method and system that provides for the non-invasive measurement of water current magnitude and direction.

BACKGROUND OF THE INVENTION

A variety of small unmanned underwater vehicles are in development and use today. In situations where precision navigation is critical (e.g., mine clearing activities carried out by torpedo-like vehicles), surface and/or underwater currents can affect navigation performance and, therefore, affect the outcome of a vehicle's mission. Accordingly, it would be beneficial to know what the surface and/or bulk underwater currents are prior to vehicle deployment in order to aid in selection of vehicle heading, speed, operating depth, etc. Ideally, measurement of surface and/or bulk underwater currents would be accomplished non-invasively (i.e., no measurement device need be placed in the water) from a remote location.

SUMMARY OF THE INVENTION

Accordingly, it is an object of the present invention to provide a method and system for measuring water currents in a body of water.

Another object of the present invention is to provide a non-invasive method and system for measuring water currents.

Yet another object of the present invention is to provide a method and system for remotely measuring underwater currents.

Other objects and advantages of the present invention will become more obvious hereinafter in the specification and drawings.

In accordance with the present invention, a method and system are provided for measuring water current. A beam of radiation is transmitted so that it is incident at a target location on the surface of a body of water at an angle with respect to the surface. The beam is modulated by an acoustic frequency. As the beam transits the water, acoustic radiation propagates away from the beam with a portion thereof propagating to the surface. As the acoustic radiation propagates to the surface of the water, it experiences a Doppler shift in frequency relative to the acoustic frequency used to modulate the beam of radiation. The Doppler shift is caused by current in the water through which the acoustic radiation transits. The Doppler-shifted frequency is measured as an indication of water current.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 3 is a schematic view of a system for carrying out the current measurement method according to another embodiment of the present invention in which a pair of interrogating beams are used at each measurement cycle.

DETAILED DESCRIPTION OF THE INVENTION

Figure 1:
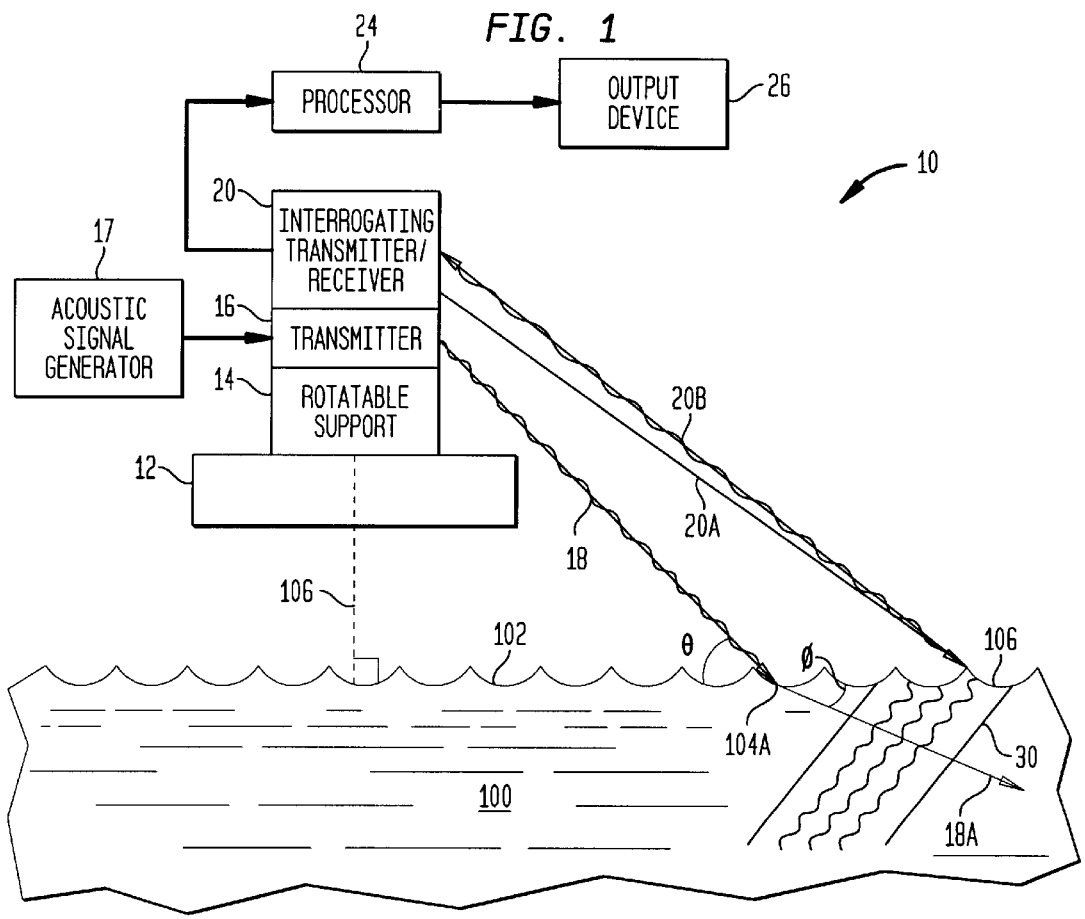
FIG. 1 is a schematic view of a system for carrying out a non-invasive opto-acoustic measurement of underwater currents according to one embodiment of the present invention.

Referring now to the drawings, and more particularly to FIG. 1, a system for carrying out a non-invasive measurement of underwater currents according to the present invention is shown and referenced generally by numeral 10. System 10 is typically mounted or deployed on a platform 12 (e.g., helicopter or other aircraft, surface ship, fixed platform, etc.) at some point above a body of water 100 (e.g., ocean, river, lake, etc.), the surface of which is indicated at 102. As is well known in the art of oceanography, "surface currents" refers to those currents occurring right at surface 102 or slightly below surface 102, i.e., extending down to a depth that is approximately equal to one wavelength of surface waves occurring at surface 102. The term "bulk underwater currents" refers to those currents in the water column beneath surface 102 and excludes the "surface currents".

Structurally, system 10 includes a platform 12 that supports thereon a rotatable support 14, a transmitter 16 having an acoustic signal generator 17 coupled thereto for transmitting an acoustically modulated beam 18 of radiation to be incident at a target location 104 on surface 102, and an interrogating transmitter/receiver 20 for transmitting an interrogating beam 20A and receiving a return beam 20B attributable to beam 20A. For reasons that will become more apparent in the following description, transmitter 16 can be rotationally disengaged from rotatable support 14 so that transmitter 16 can remain stationary while transmitter/receiver 20 is rotated by rotatable support 14. A processor 24 (located locally or remotely) will typically be coupled to receiver 20 for processing the output thereof. Processor 24 can also be coupled to rotatable support 14 for control thereof. An output device 26, e.g., display screen, printer, simulated voice device, etc., can be coupled to processor 24 to provide an output indicative of the current measurement.

Transmitter 16 is generally a single-mode laser capable generating beam 18 with a wavelength between approximately 600–900 nanometers (nm). In this spectral region, beam 18 penetrates surface 102 and is absorbed by the water along a path 18A dictated by Snell's Law. More specifically, beam 18 is incident on surface 102 at target location 104 at an angle θ with respect thereto. Beam 18 propagates under surface 102 along path 18A at an angle φ with respect to surface 102. As is known in the art, the angles θ and φ are related according to the following expression:

$$\phi = \text{Arc sin} ((1/n) \sin \theta)$$

where n is the index of refraction for water. Beam 18 will generally make a relatively large angle (typically 45–60°) with nadir, i.e., an imaginary vertical line 106 dropped from transmitter 16 and normal to surface 102. That is, angle θ is typically in the range of approximately 30–45°.

Acoustic signal generator 17 generates an acoustic frequency that is coupled to transmitter 16 for acoustically modulating beam 18. While not a requirement of the present invention, transmitter 16 is preferably a diode laser since diode lasers are inherently easier to modulate than other types of lasers and since diode lasers more efficiently utilize their input power relative to other types of lasers.

As mentioned above, the water absorbs optical energy along path 18A through an absorption process, the details of which are described by Rish et al. in "The Generation of Acoustic Signals in a Marine Environment by Controlled Thermooptical Transduction: A Preliminary Report," NAVCOASTSYSCEN ™ 491-88, Naval Coastal Systems Center, Panama City, Fla., 1989, the contents of which are hereby incorporated by reference. As a result of the absorption process, a broad beam 30 of acoustic radiation propagates away from the optical beam propagating along path 18A. Owing to the angle φ of path 18A, some of acoustic beam 30 propagates up to surface 102 and ensonifies a region 106 thereof. The frequency of acoustic beam 30 is initially equal to the acoustic frequency (output by acoustic signal generator 17) used to acoustically modulate beam 18. For wavelengths of beam 18 in the range of 600–900 nm, beam 30 propagates approximately perpendicularly away form path 18A thereby ensuring ensonification at surface 102.

The motion of the current under surface 102 induces a Doppler shift in acoustic beam 30 as it transits to surface 102. The Doppler shift in frequency is essentially relative to the acoustic frequency output by generator 17 as beam 30 propagates to surface 102. This wavelength (or frequency) shift is detectable in light. That is, the Doppler-shifted frequency can be detected by directing beam 20A at a spot 107 lying within region 106. As a result, beam 20A is modulated acoustically by the Doppler-shifted frequency of beam 30 at region 106 when being reflected back to transmitter/receiver 20 as Doppler-shifted return 20B.

Since it is desired to interrogate just surface 102 with beam 20A, the wavelength of beam 20A should be chosen such that it does not penetrate more than a few feet into water 100. Accordingly, beam 20A should have a wavelength greater than approximately 1000 nm. In addition, since the direction of the water current is not known, it is necessary to interrogate surface 102 (using beam 20A) at a number of spots about target location 104. This could be achieved by using a single transmitter/receiver 20 (as illustrated in FIG. 1) and rotating same independently of transmitter 16 so that beam 20A is transmitted to, and beam 20B is reflected from, a plurality of spots surrounding target location 104. The spot generating the largest difference between the Doppler-shifted frequency and the frequency output by generator 17 is indicative of the direction of the water current. The magnitude of this difference is indicative of the magnitude of the water current.

Figure 2:
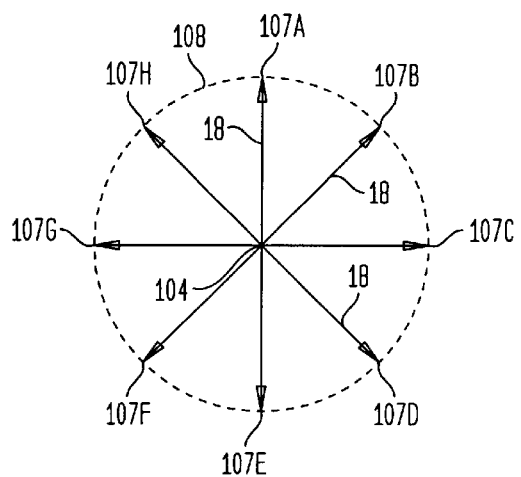
FIG. 2 is a schematic view illustrating a plurality of beams distributed evenly throughout 360° about the target location.

In operation, with beam 18 being trained on target location 104, rotatable support 14 rotates transmitter/receiver 20 to a plurality of positions about target location 104. For example, as best seen in FIG. 2, beam 20A can be sequentially trained on spots 107A–107H with each of spots 107A–107H indicating a unique compass heading. That is, spots 107A–107H are located on an imaginary circle 108 traced about target location 104. Once the measurement cycle for an interrogation spot is complete, transmitter/receiver 20 is rotated to illuminate a new spot on circle 108. The process is repeated for a plurality of discrete spots distributed evenly on circle 108 until transmitter 16/receiver 20 has been rotated through 360° with measurements being taken at each discrete step. The number of discrete spots used for taking measurements can be as few as three (i.e., spaced 120° apart), or as many as required or as time permits.

The measurements can be stored and/or processed at processor 24. Processor 24 typically includes a spectrum analyzer or custom electronics capable of performing such function so that the measured Doppler-shifted frequency can be compared to the acoustic frequency produced by generator 17. The largest difference between the Doppler-shifted frequency and the acoustic frequency produced by generator 17 is indicative of the magnitude of the bulk underwater current while the angular position or compass heading of the interrogated spot associated with the largest difference is indicative of current direction. Interim results or just the final current magnitude and direction can be output to output device 26.

Another system/method for implementing the present invention will now be described with the aid of FIG. 3 where like reference numerals are used for those elements common with system 10 (FIG. 1). In FIG. 3, a system 50 uses transmitter 16 and transmitter/receiver 20 as previously described, but also uses a second interrogating transmitter/receiver 21 to focus a second interrogating beam 19A simultaneously at a spot 107E that is 180° away from spot 107A. In other words, beams 19A and 20A are directed at spots located at radially opposing positions or compass headings relative to target location 104. Processor 24 uses returns 19B and 20B in a heterodyne mode where the two returns are "beat" against each other to produce an output that is a direct determination of the Doppler-shifted frequency of acoustic beam 30. In using system 50, it may be possible to just rotate transmitter/receivers 20 and 21 through a circular arc of 180° in order to take measurements about a full 360°. Practically, however, system 50 is preferably rotated through a full 360° in order to account for various measurement asymmetries due to, for example, wind-generated surface waves.

Figure 4:
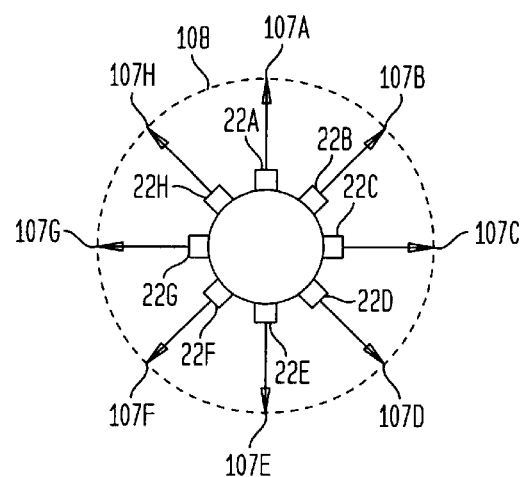
FIG. 4 is a schematic top view of another system for simultaneously transmitting the plurality of interrogating beams of radiation.

Although the present invention has been described for systems/methods requiring the rotation of interrogation transmitter/receiver(s), this need not be the case. For example, as illustrated in FIG. 4, a plurality of stationary interrogating transmitter/receivers 22A–22H could be used to simultaneously illuminate spots 107A–107H, respectively, on circle 108 and simultaneously measure the associated Doppler-shifted frequencies of the returns (not shown in FIG. 4 for clarity of illustration). While such a configuration is more costly, it will be able to more quickly determine current magnitude and direction.

The advantages of the present invention are numerous. Non-invasive water current measurements are made by simply detecting the Doppler effect on an acoustic signal. The acoustic signal is easily generated by modulating an optical beam, the wavelength of which can be selected to reach a certain depth of water where currents need to be evaluated. Systems embodying the method of the present invention can be constructed using a variety of off-the-shelf components.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of measuring water current, comprising the steps of: transmitting a beam of optical radiation to be incident at a target location on the surface of a body of water at an angle with respect to the surface, said beam being modulated by an acoustic frequency wherein, as said beam transits the water, energy from said beam is absorbed by the water thereby generating acoustic radiation in the water that propagates away from said beam as said beam transits the water such that a portion of said acoustic radiation propagates to the surface and experiences a Doppler shift in frequency relative to said acoustic frequency due to current in the water through which said portion transits wherein said portion exhibits a Doppler-shifted frequency; and measuring said Doppler-shifted frequency associated with said portion of said acoustic radiation as an indication of water current.

2. A method according to claim 1 wherein said step of measuring comprises the steps of:

transmitting a plurality of beams of radiation to be incident on the surface at positions surrounding said target location, wherein a corresponding plurality of return beams are generated at the surface, and wherein at least one of said plurality of return beams is modulated by said portion of said acoustic radiation at said Doppler-shifted frequency;

detecting said plurality of return beams;

determining said Doppler-shifted frequency using said at least one of said plurality of return beams; and determining a difference between said Doppler-shifted frequency and said acoustic frequency, wherein said difference is indicative of water current.

3. A method according to claim 2 wherein said steps of transmitting and detecting are carried out for each of said plurality of beams one at a time.

4. A method according to claim 2 wherein said step of transmitting is carried out simultaneously for more than one of said plurality of beams.

5. A method according to claim 1 wherein said angle is in the range of approximately 30–45°.

6. A method according to claim 1 wherein said plurality of beams are distributed evenly throughout a 360° circular arc about said target location.

7. A method of measuring water current, comprising the steps of:

transmitting a beam of optical radiation through the air to be incident at a target location on the surface of a body of water at an angle with respect to the surface, said beam having a wavelength in the range of 600–900 nanometers and being modulated by an acoustic frequency wherein, as said beam transits the water, energy from said beam is absorbed by the water thereby generating acoustic radiation in the water that propagates approximately perpendicularly away from said beam as said beam transits the water such that a portion of said acoustic radiation propagates to the surface and experiences a Doppler shift in frequency relative to said acoustic frequency due to current in the water through which said portion transits wherein said portion exhibits a Doppler-shifted frequency; and measuring said Doppler-shifted frequency associated with said portion of said acoustic radiation as an indication of water current.

8. A method according to claim 1 wherein said step of measuring comprises the steps of:

transmitting a plurality of beams of radiation to be incident on the surface at positions surrounding said target location, each of said plurality of beams having a wavelength greater than 1000 nanometers, wherein a corresponding plurality of return beams are generated at the surface, and wherein at least one of said plurality of return beams is modulated by said portion of said acoustic radiation at said Doppler-shifted frequency;

detecting said plurality of return beams;

determining said Doppler-shifted frequency using said at least one of said plurality of return beams; and determining a difference between said Doppler-shifted frequency and said acoustic frequency, wherein said difference is indicative of water current.

9. A method according to claim 8 wherein said steps of transmitting and detecting are carried out for each of said plurality of beams one at a time.

10. A method according to claim 8 wherein said step of transmitting is carried out simultaneously for more than one of said plurality of beams.

11. A method according to claim 7 wherein said angle is in the range of approximately 30–45°.

12. A method according to claim 7 wherein said plurality of beams are distributed evenly throughout a 360° circular arc about said target location.

13. A system for measuring water current, comprising:

means for transmitting a beam of optical radiation to be incident at a target location on the surface of a body of water at an angle with respect to the surface, said beam being modulated by an acoustic frequency wherein, as said beam transits the water, energy from said beam is absorbed by the water thereby generating acoustic radiation in the water that propagates away from said beam as said beam transits the water such that a portion of said acoustic radiation propagates to the surface and experiences a Doppler shift in frequency relative to said acoustic frequency due to current in the water through which said portion transits wherein said portion exhibits a Doppler-shifted frequency; and means for measuring said Doppler-shifted frequency associated with said portion of said acoustic radiation as an indication of water current.

14. A system as in claim 13 wherein said means for transmitting said beam of radiation comprises a laser producing said beam of radiation.

15. A system as in claim 14 wherein said laser is a diode laser.

16. A system as in claim 13 wherein said beam of radiation has a wavelength in the range of approximately 600–900 nanometers.

17. A system as in claim 13 wherein said means for measuring comprises:

means for transmitting a plurality of beams of radiation to be incident on the surface at positions surrounding said target location, wherein a corresponding plurality of return beams are generated at the surface, and wherein at least one of said plurality of return beams is modulated by said portion of said acoustic radiation at Doppler-shifted frequency;

means for detecting said plurality of return beams;

means for determining said Doppler-shifted return using said at least one of said plurality of return beams; and means for determining a difference between said Doppler-shifted frequency and said acoustic frequency, wherein said difference is indicative of water current.

18. A system as in claim 17 wherein said means for transmitting said plurality of beams includes a laser producing said plurality of beams, wherein each of said plurality of beams has a wavelength of greater than 1000 nanometers.

19. A system as in claim 17 wherein said means for transmitting said plurality of beams comprises:

a transmitter for transmitting at least one of said plurality of beams; and means coupled to said transmitter for rotating said transmitter in a plurality of discrete steps, each of said plurality of discrete steps being indicative of a compass heading.

* * * * *